United States Patent [19]

Joyce et al.

[11] Patent Number: 4,641,305
[45] Date of Patent: Feb. 3, 1987

[54] CONTROL STORE MEMORY READ ERROR RESILIENCY METHOD AND APPARATUS

[75] Inventors: Thomas F. Joyce, Westford, Mass.; Richard P. Kelly, Nashua, N.H.

[73] Assignee: Honeywell Information Systems Inc., Waltham, Mass.

[21] Appl. No.: 663,101

[22] Filed: Oct. 19, 1984

[51] Int. Cl.$^4$ .................. G06F 11/10; G06F 11/14
[52] U.S. Cl. ............................. 371/12; 371/13; 371/16; 371/19
[58] Field of Search ............ 371/15, 16, 18, 19, 371/12, 13; 364/200, 900

[56] References Cited

U.S. PATENT DOCUMENTS

| 3,696,340 | 10/1972 | Matsushita | 364/200 |
| 3,736,566 | 5/1973 | Anderson | 371/12 |
| 4,231,089 | 10/1980 | Lewine | 371/12 |
| 4,315,313 | 2/1982 | Armstrong | 371/16 |
| 4,535,455 | 8/1985 | Peterson | 371/13 |

Primary Examiner—Jerry Smith
Assistant Examiner—Robert W. Beausoliel, Jr.
Attorney, Agent, or Firm—George Grayson; John S. Solakian

[57] ABSTRACT

A method and apparatus for a microinstruction controlled unit to recover from a read error in reading microinstructions from a control store. The method provides for the overlapping of the execution of a current microinstruction while the next microinstruction is being addressed and read from the control store. Execution of the current microinstruction is begun before it is known whether or not it was read without error. The apparatus provides for aborting the execution of the current microinstruction with the read error and the next microinstruction. During the aborted execution of the next microinstruction, the current microinstruction is reread from the control store and then executed while the next microinstruction is being reread. The execution of microinstructions is aborted in a manner that does not alter the state of the microinstruction controlled unit beyond the point that would inhibit the re-execution of the aborted microinstructions.

14 Claims, 4 Drawing Figures

CONTROL STORE MEMORY READ ERROR RESILIENCY METHOD AND APPARATUS

RELATED APPLICATIONS

The following patent applications, which are assigned to the same assignee as the instant application, have related subject matter and are incorporated herein by reference. Certain portions of the system and processes herein disclosed are not our invention, but are the invention of the below-named inventors as defined by the claims in the following patent applications:

U.S. patent application Ser. No. 663,096 entitled, "Distributed Control Store Word Architecture", having inventors Richard P. Kelly and Thomas F. Joyce.

BACKGROUND OF THE INVENTION

1. Field of the Invention

The method and apparatus of the present invention generally relates to a method for recovering from a memory read error in an instruction word used to control a programmable device and, more particularly, to a method for recovering from a control store memory read error of a microinstruction in a microprogrammed electronic data processing system.

2. Background of the Invention

It is common practice today to implement data processing systems in which the software instruction is executed by use of microprocessors which are firmware controlled. In this system, the firmware is stored as a series of microinstructions in a memory referred to as a control store. The control store may be a random access memory (RAM) which can be written into, as well as read from, or it may be a read only memory (ROM) of one type or another. In either case, as the use of firmware increases with more of the logic of systems being microprogrammable, and as faster memories are used in order to decrease the time required to perform operations, it is becoming more likely that a read error will occur when microinstructions are read from the control store. Many of the errors which occur when reading data from RAMs and ROMs are of a transient nature and will not recur if the same data is read a second time from the memory.

One method of detecting a memory read error is to store one or more parity bits with the instructions and to compute the parity of the instruction read from memory and compare it with the parity bit or bits stored with the instruction and if there is a mismatch to go back and read the instruction again. Although this scheme works, it has the disadvantage that execution of the program is delayed because an instruction cannot be executed until its parity is computed and compared with the stored parity.

One method of overcoming this delay associated with checking the parity of each instruction before it is executed is to prefetch instructions so that the parity of one instruction can be checked while a previously checked instruction is being executed. Although this scheme can be used to advantage to eliminate the delays associated with checking parity prior to instruction execution, it has the disadvantage that it can become quite complex and therefore costly because the execution of one instruction will often determine which is the next instruction to be executed and therefore prefetching the "next" instruction can be very complicated or impossible. One method of simplifying this prefetch problem is to prefetch the "normal next" instruction and check it for possible read errors and if the normal next instruction turns out not to be the "next" instruction, the "normal next" instruction is discarded (i.e., flushed from a buffer) and the system waits while the "next" instruction is read and checked. Even this "flushing" scheme can be complex and still result in delays each time the instructions aren't executed in the "normal" sequence.

Therefore, what is needed is a method of detecting and correcting instruction memory read errors which is simple and which does not adversely effect the execution time of the system.

OBJECTS OF THE INVENTION

Accordingly, it is an object of the present invention to provide a simple method of detecting and recovering from instruction read errors in a programmable device.

It is another object of the present invention to provide a method of detecting and recovering from instruction read errors that does not adversely affect the execution time of instructions read without errors.

It is a still further object of the present invention to provide a low cost method of detecting and recovering from read errors in instructions controlling a programmable device.

This invention is pointed out with particularity in the appended claims. An understanding of the above and further objects and advantages of this invention can be obtained by referring to the following description taken in conjunction with the drawings.

SUMMARY OF THE INVENTION

The present invention provides for instruction read error detection and recovery by permitting the unchecked instruction to be executed in parallel with instruction read error detection by providing for the aborting of the instruction execution upon detection of an error prior to making any change in the state of the system which would prevent the retrying of the instruction after it is read again from memory. Because the reading of the next instruction is initiated during the execution of the current instruction whose validity is checked in parallel with its execution, the present invention provides for the discarding of the next instruction prior to retrying the current instruction by rereading the current instruction followed by re-execution of the current instruction. While the current instruction is being re-executed, the rereading of the next instruction is initiated so that it will be available for execution following the re-execution of the current instruction.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which.

DESCRIPTION OF THE PREFERRED EMBODIMENT

The present invention provides for instruction read error detection and recovery by permitting the unchecked instruction to be executed in parallel with instruction read error detection by providing for the aborting of the instruction execution upon detection of an error prior to making any change in the state of the system which would prevent the retrying of the instruction after it is read again from memory. Because the reading of the next instruction is initiated during the execution of the current instruction whose validity is checked in parallel with its execution, the present invention provides for the discarding of the next instruction prior to retrying the current instruction by rereading the current instruction followed by re-execution of the current instruction. While the current instruction is being re-executed, the rereading of the next instruction is initiated so that it will be available for execution following the re-execution of the current instruction.

Figure 1:
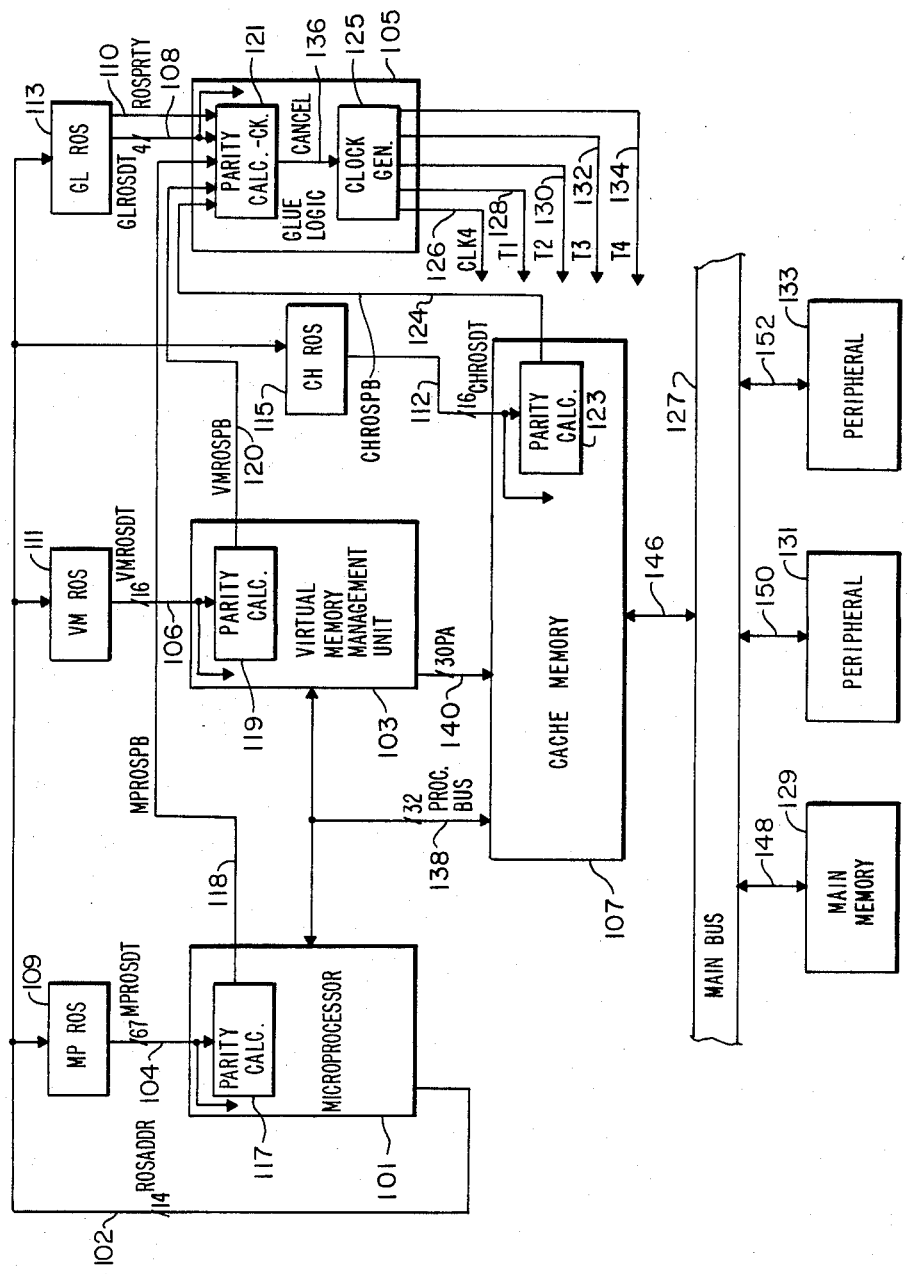
FIG. 1 is a block diagram of a data processing system incorporating the present invention.

The central processor unit (CPU) and other elements comprising the electronic data processing system of the preferred embodiment of the present invention are illustrated in FIG. 1. In FIG. 1, the CPU is comprised of those elements above main bus 127. The CPU communicates with the other elements in the system through lines 146 which contain address data and control lines to main bus 127. Main bus 127 is also comprised of address, data and control lines and serves as the main path for information which is communicated between main memory 129 and peripherals 131 and 133. Main memory 148 stores data and software program instructions which are executed by the CPU. Main memory 129 is connected to main bus 127 by lines 148. Peripherals 131 and 133, which are connected to main bus 127 by lines 150 and 152 respectively, are input/output units which are used to enter, retain or output data into and out of the system.

The logic of the central processor unit can be divided into four groups as shown in FIG. 1. Microprocessor 101 performs the basic arithmetic and logic operations of the central processor unit by executing the software instructions of the software program stored in main memroy 129. Virtual memory management unit 103 converts the virtual memory addresses contained in the software instructions into a physical address which is passed to cache memory 107 on lines 140. In the preferred embodiment, a 30 bit physical address is calculated by virtual memory management unit 103. This 30 bits of address is indicated by the number 30 next to the diagonal slash on line 140. Cache memory 107 takes the physical address provided by virtual memory management unit 103 and does either a read memory or write memory operation from or to main memory 129 or retrieves the data or software instruction from its own internal memory. The information retrieved from cache memory 107 is provided to microprocessor 101 or virtual memory management unit 103 through processor bus 138 which is a 32 bit wide bus. Glue logic 105 contains miscellaneous logic which ties microprocessor 101, virtual memory management unit 103 and cache memory 107 together and, as illustrated in FIG. 1, contains a parity calculator-checker 121 and clock generator 125.

The central processor unit of FIG. 1 is firmware controlled such that the microprocessor 101, virtual memory management unit 103, cache memory 107 and glue logic 105 each are controlled by microoperations from microinstructions contained within the control store. As illustrated in FIG. 1, the control store of the preferred embodiment is a read only storage, which is distributed throughout the processor such that the microoperations for the various units are stored in a local read only storage (ROS) which is close to the logic which utilizes the microoperations. This distribution of the ROS has the advantage that the relatively narrow 14-bit address which is used to address the control store is distributed throughout the central processor, whereas the relatively wide 104 bit microinstruction is broken into 4 elements so that each of the local ROS's is close to the logic which utilizes the various microoperations. Therefore, as can be seen in FIG. 1, microprocessor 101 obtains its 67 bits of microoperations as signals MPROSDT on line 104 from microprocessor ROS 109. Virtual memory management unit 103 obtains its 16 bits of microoperations as signals VMROSDT on lines 106 from virtual memory ROS 111. Cache memory 107 obtains its 16 bits of microinstructions as signals CHROSDT on lines 112 from cache ROS 115, and glue logic 105 obtains its 4 bits of microoperations as signals GLROSDT on lines 108 from glue ROS 113. In addition, glue logic ROS 113 provides signal ROSPRTY which is an overall ROS odd parity bit so that each 103 bit microinstruction has a 104th bit of odd parity associated with it. That is, the number of bits in the binary ONE state in each 104-bit microinstruction word in the control store will be an odd number.

The addressing of the control store, which is composed of the four ROS's 109, 111, 113, and 115 is under the control of microprocessor 101 which calculates the address of the next microinstruction and produces a 14-bit address as signal ROSADDR on lines 102 which is used to address each of the ROS's. This 14-bit control store address allows for the addressing of 16K (1K=1024) of 104-bit words in the control store.

By having an odd parity bit (ROSPRTY) as bit 104 associated with each microinstruction, the central processor unit is able to detect whether the microinstruction word read from the control store was read without a single bit error. The detection of read errors as each microinstruction word is read from the control store is performed by parity calculator-checker 121 in glue logic 105. If parity calculator-checker 121 detects a difference between the parity calculated for the microinstruction word and the parity bit contained in the microinstruction word, it produces a CANCEL signal on line 136 which prevents clock generator 125 from generating clocking signal CLK4 on line 126. In addition to producing clock signal CLK4, clock generator 125 produces clock signals T1, T2, T3 and T4 on lines 128, 130, 132 and 134 respectively. These four clock signals T1 through T4 and CLK4 are used throughout the central processor to clock various operations within microprocessor 101, virtual memory management unit 103, cache memory 107 and glue logic 105.

Because the control store is broken into four separate ROS's, with each separate ROS being located near the logic which its microoperations control, the calculation of the parity of a microinstruction is also distributed. Therefore, parity calculator 117 in microprocessor 101 calculates the parity of the 67 bits of microinstruction received form microprocessor ROS 109. Similarly, parity calculator 119 in virtual memory management unit 103 calculates the parity of the 16 bits of microoperations received from virtual memory ROS 111 and parity calculator 123 in cache memory 107 calculates the parity of the 16 bits of microoperations received from cache ROS 115. Parity calculator 117 produces parity signal MPROSPB on line 118, parity calculator 119 produces parity signal VMROSPB on line 120, and parity calculator 123 produces parity signal CHROSPB on line 124. These three parity signals MPROSBP, VMROSPB and CHROSPB are inputs into parity calculator-checker 121 along with the four bits of the microoperation received from glue logic ROS 113. These seven bits along with the odd parity bit ROSPRTY from the microinstruction words are then used by parity calculator-checker 121 to compute the total parity of the microinstruction word. If the calculated parity does not agree with the stored parity, the cancel signal CANCEL on line 136 is produced. As will be seen below, the CANCEL signal is used to cancel the execution of the current microinstruction which contains a read error. The microinstruction is then refetched from the control store and re-executed.

The method by which the present invention cancels the execution of a microinstruction that is determined to have a read error in it and the method by which the microinstruction is reread from the control store and re-executed will be described with reference to FIGS. 2 and 3 which show in greater detail the logic of microprocessor 101, parity calculator-checker 121 and clock generator 125. The operation of the logic of FIGS. 2 and 3 will also be discussed with reference to FIG. 4 which shows a timing diagram of various clock timing signals and ROS address and data signals and read error signals.

Figure 4:
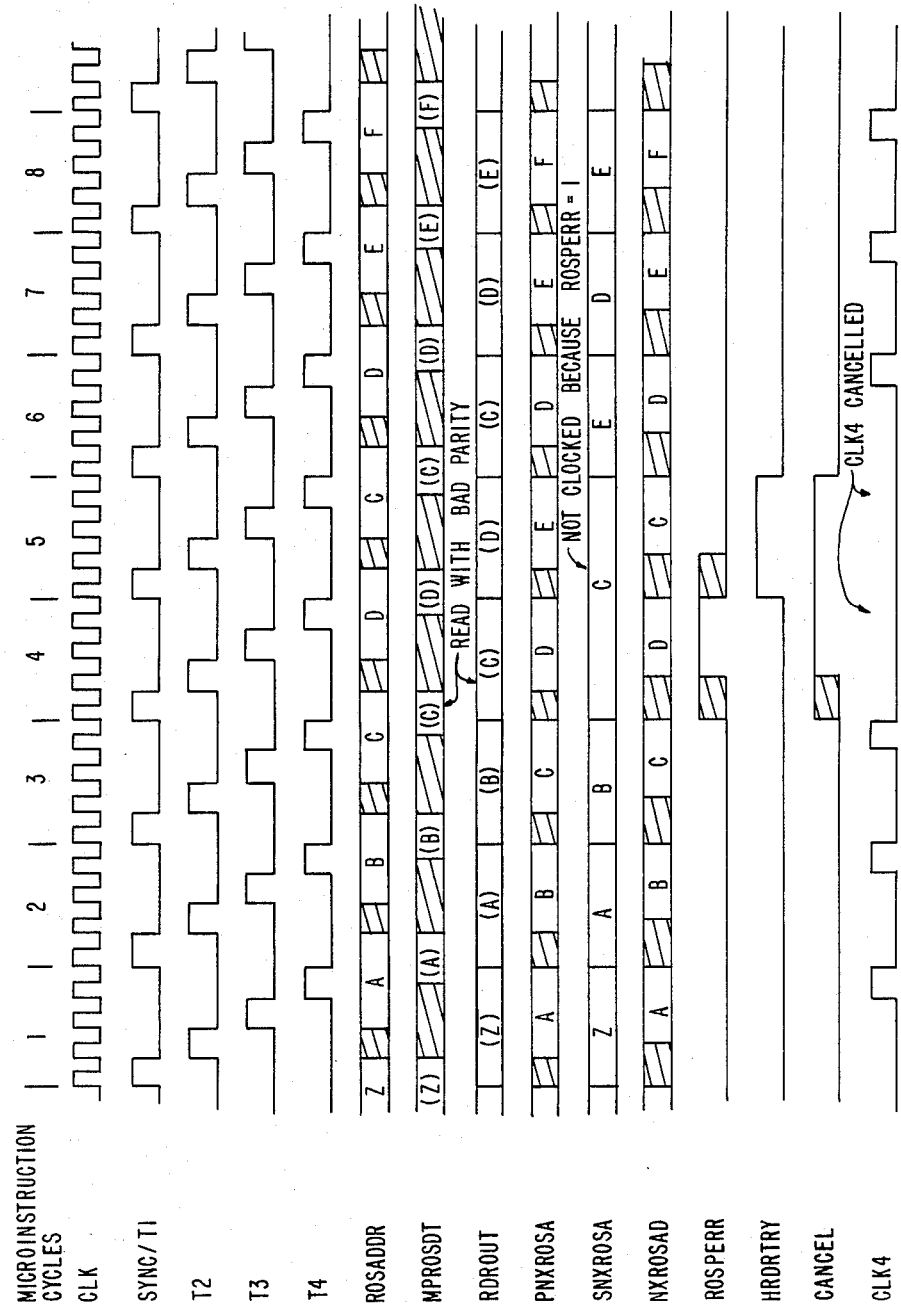
FIG. 4 is a timing diagram of various clocking, control store addressing, and control store data signals used by the logic of FIGS. 2 and 3.

As indicated above, the system of the preferred embodiment is designed so that the major elements within the CPU are firmware controlled by microoperations with the microprocessor 101 responsible for calculating the address of the next microinstruction to be fetched, a part of it being read from microprocessor ROS 109, virtual memory ROS 111, glue logic ROS 113 and cache ROS 115. The CPU is designed so that during the execution of a first microinstruction the address of the second microinstruction is presented to each of the ROS's and the reading of the second microinstruction is initiated during the execution of the first microinstruction so that the second microinstruction will be available upon the completion of the execution of the first microinstruction. This overlapping of the reading of the next microinstruction during the execution of the current microinstruction is illustrated in FIG. 4 which shows that the 14-bit control store address signal ROSADDR on lines 102 at the output of ROS address register 209 is addressing control store location B during the end of cycle 2 while the contents of ROS data register 201, the output of which is the 67 firmware bits that control microprocessor 101 as signals RDROUT on lines 202 contain the contents of memory location A, which is the current microinstruction being executed during cycle 2. In FIG. 4, the contents of a memory location is indicated by putting the memory location address "A", "B", "C", etc. within parentheses, as seen for signals MPROSDT and RDROUT.

In the preferred embodiment, the time required to execute a microinstruction by the CPU is broken into four equal time periods: Time 1, Time 2, Time 3 and Time 4. The total time required to execute one microinstruction is approximately 160 nanoseconds and therefore Time 1 through Time 4 are each 40 nanoseconds long. The CPU logic utilizes timing signals T1 through T4 associated with Time 1 through Time 4 to clock various logic elements within the CPU. FIG. 3 shows that a 25 megahertz oscillator 319 is used to produce the basic clocking signal CLK on line 320. Signal CLK is in the high (binary ONE) state for 20 nonoseconds and in the low (binary ZERO) state for 20 nanoseconds during each basic clock period as can be seen in FIG. 4. Signal CLK on line 320 is connected to the clock (C) input of clock register 327 and to one input of AND gate 323. Clock register 327 is a D-type register of the type enabled by a binary ZERO at the enable (EN) input and clocks the signals at its D inputs onto the corresponding Q outputs. The small circle on the inputs, such as the enable input of register 327, or outputs of the elements in FIGS. 2 and 3 indicate an inverting input or output, respectively. Since signal MPRERR at the enable input of clock register 327 is normally in the binary ZERO state, clock register 327 is normally enabled. Signal MPRERR becomes a binary ONE and disables the clock and freezes the state of the CPU by inhibiting the further execution of the microinstructions if an error is detected within microprocessor 101, but for the purposes of discussing the present invention it shall be considered to be a binary ZERO thus continually enabling clock register 327. The binary ONE at the clear (CLR) and the binary ZERO at the function (F) input of clock register 327 inhibit the clearing of the register and enable the outputs, respectively.

Ring counter 325 is a 4-bit ring counter of conventional design. Each fourth time clocking signal CLKC on line 324 at its clock (C) input becomes a binary ONE, its output signal, SYNC, on line 326 becomes and remains a binary ONE until the next time ring counter 325 is clocked by the transition of the CLKC signal from the binary ZERO to the binary ONE state. AND gate 323 is normally enabled by signal WAIT at the input of inverter 321 being a binary ZERO thus making the output of inverter 321, signal WAIT-bar, the inverse of signal WAIT, a binary ONE. Thus, during normal operation ring counter 325 will be clocked by each fourth transition of clocking signal CLK on line 320 from oscillator 319 (see FIG. 4). Signal WAIT is used within the central processor to indicate when the clock must be temporarily stalled in order to wait for some event to happen. Generally, it is used to temporarily stall the CPU until data becomes available from cache memory 107.

Assuming that there is no need to wait for some event to happen within the central processor, and therefore signal WAIT is a binary ZERO, signal SYNC at the D0 input of clock register 327 will become a binary ONE each fourth time that clock register 327 is clocked by signal CLK on line 320. As is illustrated in FIG. 4, each fourth basic clock period when signal SYNC at the D0 input of clock register 327 is a binary ONE, the clocking of the register by signal CLK becoming a binary ONE will result in the Q0 output on line 340, signal T2, becoming a binary ONE. Signal T2 remains in the binary ONE state for one basic clock period (one cycle of signal CLK). Because signal T2 on line 340 is connected to the D1 input of clock register 327, the next time that the clock register 327 is clocked, its corresponding Q1 output will result in signal T3 on line 342 becoming a binary ONE and remaining a binary ONE for one basic clock period as shown in FIG. 4. Signal T3 on line 342 is connected to the D2 input of clock register 327 resulting in signal T4 on line 344 at the Q2 output of clock register 327 becoming a binary ONE the next time the clock register is clocked by signal CLK becoming a binary ONE. Signal T4 will remain a binary ONE for one clock period as shown in FIG. 4 and as an input to the D3 input of clock register 327 will result in signal T1 on line 346 becoming a binary ONE the next time clock register 327 is clocked by signal CLK as shown in FIG. 4. The fourth clocking of clock register 327 by basic clock signal CLK, which results in signal T1 becoming a binary ONE at the Q3 output of clock register 327, will also result in signal SYNC at the output of ring counter 325 becoming a binary ONE. Therefore, when the clock register is being clocked by the beginning of the fifth basic clock cycle, the T2 signal at the Q0 output of clock register 327 will again become a binary ONE as shown in FIG. 4.

Signal T3 on line 342, in addition to being connected to the D2 input of clock register 327 to produce timing signal T4, is also connected to one input of AND gate 331. As long as the CANCEL signal on line 136 is a binary ZERO, the output of inverter 329, which is signal CANCEL-bar on line 330, will be a binary ONE thus enabling AND gate 331 so that the state of its output, signal SETCLK4 on line 332, will be determined by the state of signal T3. Therefore, unless the CANCEL signal is a binary ONE, the clocking signal CLK4 on line 348 at the Q4 output of clock register 327 will be the same as the timing signal T4 on line 344. If the cancel signal becomes a binary ONE, AND gate 331 will be disabled and clock register 327 will not produce signal CLK4 in the binary ONE state at the same time that timing signal T4 becomes a binary ONE. This can be seen in FIG. 4 wherein during the time that the CANCEL signal is in the binary ONE state, the CLK4 signal remains in the binary ZERO state during the time that timing signal T4 is in the binary ONE state.

Before discussing how parity calculator-checker 121 produces the CANCEL signal, the operation of the logic in FIG. 2 will be described in conjunction with the timing of the various signals shown in FIG. 4. As described above, the address of the next microinstruction to be read from the control store is determined by the microprocessor 101. Within microprocessor 101, the generation of the next ROS address is primarily a function of next address generation logic 203, which receives as input some of the bits from the currently executing microinstruction which is stored in ROS data register 201 and is available as signal RDROUT on lines 202 and by the decoding of the microoperations encoded in the current microinstruction. The decoding of the microoperations is performed by microoperation decoder 211. FIG. 4 shows that the 14-bit probable next ROS address at the output of next address generation logic 203 on lines 204 is available during Times 2, 3 and 4 (i.e., when signals T2, T3 and T4 are high, respectively).

In FIG. 4, the shaded areas represent periods during which the state of the signals are indeterminate. For example, signal PNXROSA, which is the probable next ROS address, is indeterminate during Times 1. FIG. 4 shows that during the first microinstruction cycle, signal PNXROSA will contain the address of control store location A. During the second microinstruction cycle, PNXROSA contains the address of control store location B. During the third microinstruction cycle, it contains the address of control store location C, etc.

As long as there is not a hardware retry condition which is caused by a microinstruction read error in existence, signal HRDRTRY at the select (S) of multiplexer 207 will be a binary ZERO and the A inputs will be connected to the outputs so that its 14-bits next ROS address, signal NXROSAD on line 208, will follow the potential next ROS address, signal PNXROSA on line 204. This can be seen in FIG. 4 which shows that sometime during Time 2, next ROS address signal NXROSAD during the first microinstruction cycle becomes equal to the address associated with location A of the control store. If a hardware retry condition exists which causes signal HRDRTRY to be a binary ONE, the stored next ROS address, signal SNXROSA on lines 206, at the B inputs of multiplexer 207 are gated onto its output causing signal NXROSAD to be equal to signal SNXROSA. Thus, during the first cycle of a hardware retry condition, the next ROS address is taken from stored ROS address register 205 instead of from the next address generation logic 203.

Stored ROS address register 205 is a D-type register which clocks its inputs onto its outputs when clocking signal CLKS at its clock (C) input transitions from the binary ZERO to the binary ONE state. Clocking signal CLKS on line 330 normally transitions from the binary ZERO to the binary ONE state at the end of Time 4 as the result of signal T4 at one input of NAND gate 229 transitioning from the binary ONE to the binary ZERO state. Clocking signal CLKS will normally transition from the binary ZERO to the binary ONE state at the end of each Time 4 as long as ROS parity error signal ROSPERR at the input of inverter 227 remains in the binary ZERO state indicating that a parity error has not been detected while reading the currently executing microinstruction from control store memory. As long as signal ROSPERR remains a binary ZERO, the output of inverter 227 will be a binary ONE thus partially enabling NAND gate 229, thus permitting the state of clocking signal CLKS to be controlled by timing signal T4. The storing of the possible next ROS address in stored ROS address register 205 at the end of Time 4 is illustrated in FIG. 4 which shows that at the beginning of Time 1 of the second microinstruction cycle, the possible next ROS address, signal PNXROSA, is clocked into stored ROS address register 205 resulting in the store next ROS address signal SNXROSA pointing to location A in the control store.

The next ROS address output by multiplexer 207 on lines 208 is latched into ROS address register 209 by clocking signal T2 at its clock (C) input. ROS address register 209 is a transparent type latch which enables its inputs onto its outputs during the time that the clocking signal is in the binary ONE state and latches the inputs onto the outputs when the clocking signal transitions from the binary ONE to the binary ZERO state. This is illustrated in FIG. 4 which shows that during the first miroinstruction cycle the ROS address signal ROSADDR points to location A within the control store during Times 3 and 4 of cycle 1 and Time 1 of cycle 2. FIG. 4 shows that the ROS address is indeterminate during Time 2 and that the inputs are latched onto the outputs at the end of Time 2.

The 14-bit ROS address ROSADDR on lines 102 is input to the address inputs of microprocessor ROS 109 to address one of the 16K locations within the control store. This 14-bit ROS address is also presented to the other portions of the control store, which are the virtual memory ROS 111, the glue logic ROS 113, and the cache ROS 115, which are illustrated in FIG. 1 but are not shown in FIG. 2. These ROS's are always read enabled by the write enable (WE) input being in the binary ZERO state as is shown for microprocessors ROS 109 in FIG. 2. After the ROS address has been established at the address inputs of microprocessor ROS 109 for a sufficient period of time to allow the ROS to read out the addressed location, the corresponding data becomes available at the data outputs of the various ROS's, and in particular, 67 bits of ROS data become available on lines 104 as signal MPROSDT. FIG. 4 shows that the contents of the address microinstruction location becomes available sometimes during Time 4 and remains available during Time 1. The output of inverter 237 is connected to the clock (C) input of ROS data register 201 which is a D-type register. When timing signal T4 at the input of inverter 237 becomes a binary ZERO, its output becomes a binary ONE and clocks ROS data register 201. Thus, it can be seen in FIG. 4 that at the end of Time 4, the 67-bit output signal on lines 202, which is signal RDROUT, will be set equal to the signal MPROSTD, which is at the input of ROS data register 201. Thus, during the second microinstruction cycle in FIG. 4, signal RDROUT contains the contents of location A of the control store and the address of location A was presented to the address inputs of the control store during the previous microinstruction cycle. Thus, it can be seen that microprocessor 101 generates the address of the next microinstruction during the time that it is executing a current microinstruction.

The method by which a control store read error is detected and by which the execution of a microinstruction is cancelled during a retry will now be discussed with reference to FIGS. 2 and 3 and the timing diagram of FIG. 4. In FIG. 2, parity calculator 117 calculates the parity of the 67 bits of the microinstruction read from microprocessor ROS 109 by receiving as inputs signal RDROUT from lines 202. Parity calculator 117 calculates the parity by performing an exclusive OR of the 67 bits and produces as output signal MPROSPB on line 118 which will be in the binary ONE state if there are an odd number of binary ONEs in the 67 bits of ROS data and in the binary ZERO state if there are an even number of binary ONEs in the 67 bits of ROS data. In FIG. 1, parity calculator 119 performs a similar parity calculation on the 16 bits of ROS data from virtual memory ROS 111 and produces parity signal VMROSPB on line 120. Parity calculator 123 in cache 107 performs a similar parity calculation on the 16 bits of ROS data from cache ROS 115 and produces parity signal CHROSPB on line 124.

Figure 3:
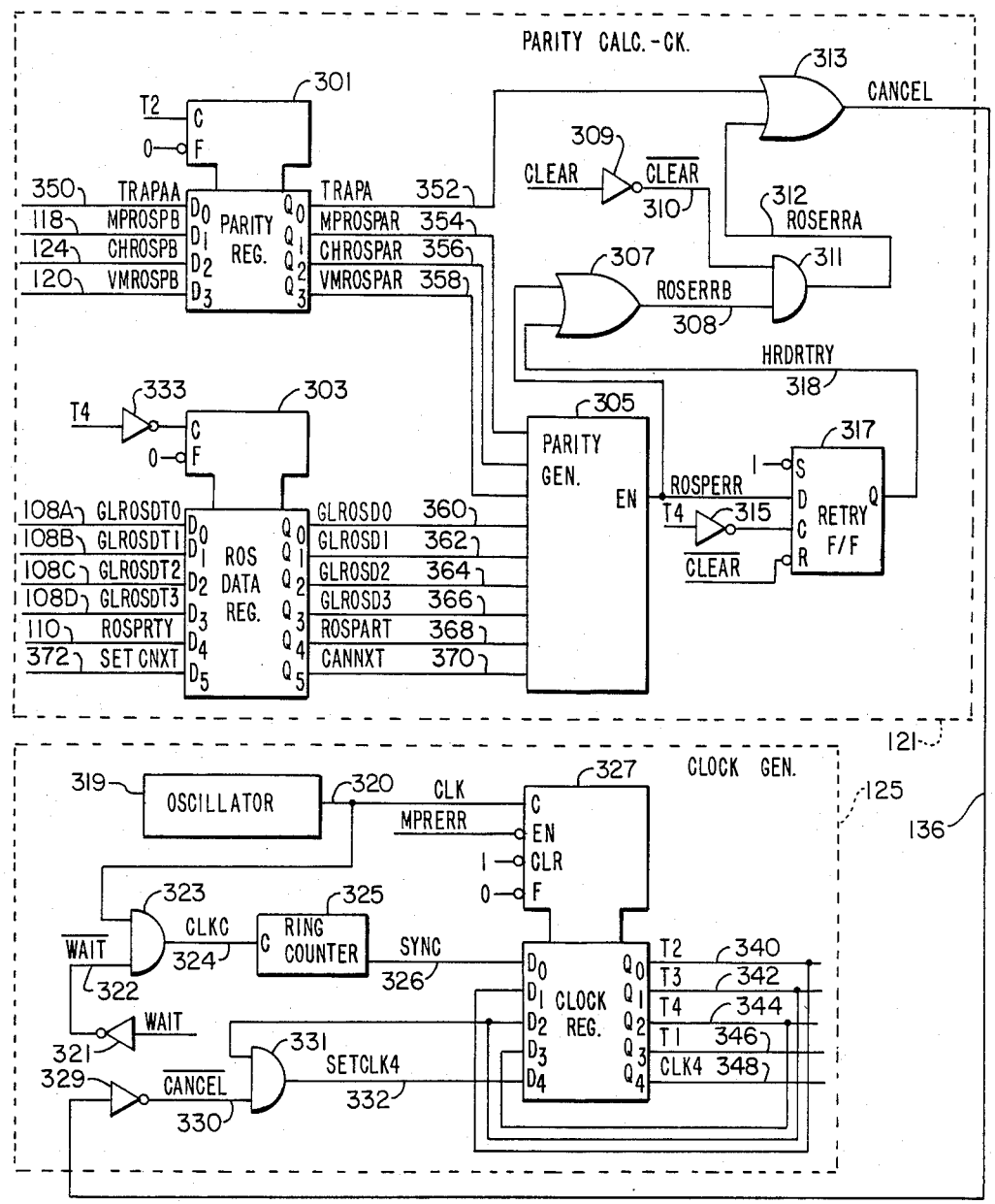
FIG. 3 is a more detailed logic block diagram of the parity calculator-checker and the clock generator of FIG. 1.

Signal MPROSPB on line 118, signal CHROSPB on line 124 and signal VMROSPB on line 120, along with signal TRAPAA on line 350 are inputs to parity register 301 as shown in FIG. 3. Parity register 301 is a D-type register which is clocked when timing signal T2 at its clock (C) input transitions from the binary ZERO to the binary ONE state at the beginning of Time 2. The outputs of parity register 301 are enabled by the function (F) input being held at a binary ZERO. Therefore, at the beginning of each Time 2, parity register 301 captures the status of its four input signals, three of which are signals which are functions of the parity of that portion of the microinstruction word from the control store which is used by its associated logic. Signals MPROSPAR on line 354, CHROSPAR on line 356 and MVROSPAR on line 357 at the Q1, Q2 and Q3 outputs of parity register 301 and which correspond to inputs signals MPROSPB, CHROSPB and VMROSPB at the D1, D2 and D3 inputs, respectively, are used as inputs to parity generator 305. The other inputs to parity generator 305 are the signals output by ROS data register 303.

ROS data register 303 is a D-type register which clocks the data (D) inputs onto the outputs (Q) when the signal at the clock (C) inputs transitions from the binary ZERO to the binary ONE state. ROS data register 303 performs a function similar to that of ROS data register 201 in microprocessor 101 in that ROS data register 303 is used to hold the microinstruction bits associated with glue logic 105. These bits are signal GLROSDT0 through GSROSDT3 on lines 108A through 108D and overall microinstruction parity bit ROSPRTY on line 110. In addition, a set cancel next control signal SETCNXT on line 372 is held in ROS data register 303. These input signals produce the corresponding output signals GLROSD0 through GLROSD3, ROSPART and CANNXT on lines 360, 362, 364 366, 368 and 370, respectively. These signals which are input to parity generator 305 correspond to the four bits of the microinstruction from glue logic ROS 113 which are used to control glue logic 105 and the overall microinstruction parity bit which is used to make the number of binary ONE bits within a 104-bit microinstruction an odd number. Signal SETCNXT which produces signal CANNXT is normally in the binary ZERO state and therefore does not affect the outcome of the parity generation calculation and check, but can be used by the system to force the cancelling and retry of a microinstruction when it is set to a binary ONE.

Parity generator 305 performs a parity calculation by performing an exclusive OR of all the input signals and produces an output signal at its even (EN) output in the binary ONE state if there is an even number of binary ONEs input signals and produces a binary ZERO at its even output if there is an odd number of binary ONE input signals. Parity generator 305 performs a parity calculation on the complete 104-bit microinstruction because signals MPROSPAR, CHROSPAR and VMROSPAR correspond to the parity of the portions of the microinstruction which are found in microprocessor ROS 109, virtual memory ROS 111 and cache ROS 115 and the four microinstruction bits plus the parity bit contained in glue logic ROS 113 are input via ROS data register 303. The even output signal ROSPERR of the parity generator, if no single bit error has occurred in reading the 104-bit microinstruction, should be a binary ZERO because there is an odd number of binary ONEs in each microinstruction word. If a single bit error has occurred while reading the microinstruction word from the control store, signal ROSPERR will be a binary ONE.

Signal ROSPERR besides feeding one input of OR gate 307 also feeds the data (D) input of retry flip-flop 317. Retry flip-flop 317 is a D-type flip-flop which is clocked by the timing signal T4. Timing signal T4 is inverted by inverter 315 and the inverted signal is fed to the clock (C) input of retry flip-flop 317; thus, at the end of Time 4 when signal T4 transitions from the binary ONE to the binary ZERO state, the inverted T4 signal changes from the binary ZERO to the binary ONE state and clocks retry flip-flop 317 to cause its Q output, signal HRDRTRY on line 318, to become a binary ONE. Signal HRDRTRY is the other input to OR gate 307. Whenever signal ROSPERR or signal HRDRTRY is in the binary ONE state, the output of OR gate 307, signal ROSERRB on line 308, will be in the binary ONE state and partially enable AND gate 311. Because the CLEAR signal is normally in the binary ZERO state, the output of inverter 309, signal CLEAR-bar on line 310, is normally in the binary ONE state thereby also partially enabling AND gate 311. The CLEAR signal when in the binary ONE state is used by the system to clear the retry condition within the central processor unit by disabling AND gate 311 and to reset retry flip-flop 317 by presenting the CLEAR-bar signal to the reset (R) input of retry flip-flop 317.

Because AND gate 311 is normally partially enabled by the CLEAR-bar signal being in the binary ONE state, the output of AND gate 311 is normally controlled by input signal ROSERRB. Therefore, as long as there is not a CLEAR condition going on when signal ROSERRB becomes a binary ONE, signal ROSERRA on line 312 will become a binary ONE and cause the output of OR gate 313, CANCEL signal on line 136, to become a binary ONE. When the CANCEL signal becomes a binary ONE, the output of inverter 329, which is signal CANCEL-bar on line 330, will become a binary ZERO and disable AND gate 331 thus blocking signal T3 at the other input of AND gate 331 from causing output signal SETCLK4 from going to the binary ONE state at Time 4 thus causing signal CLK4 to remain in the binary ZERO state. The other condition which can cause the CANCEL signal to assume the binary ONE state is if a trap condition is present in the system causing signal TRAPAA on line 350 to become a binary ONE which in turn causes signal TRAPA on line 352 to become a binary ONE which is the other input to OR gate 313 which in turn will cause the CANCEL signal to become a binary ONE and inhibit clocking signal CLK4 from becoming a binary ONE during Time 4.

The method by which the present invention detects a control store read error and aborts the execution of a microinstruction and retries it will now be discussed with reference to FIGS. 2 and 4. As described earlier, FIG. 4 is a timing diagram of: various signals associated with the basic timing within the CPU, control store addresses, the availability of the microinstructions from the control store, and control store read error detection signals. FIG. 4 shows 8 cycles of the central processing system with one microinstruction being executed during each cycle. Cycles are arbitrarily defined to begin at the beginning of Time 1 and ending at the end of Time 4. FIG. 4 shows the execution of a sequence of microinstructions beginning with the microinstruction located in control store location Z and then locations A through E.

In FIG. 4, as will be seen below, it is assumed that the first time that the microinstruction stored in control store location C is read a parity error is detected and the execution of that instruction is aborted and the microinstruction is reread from the control store with the second reading of microinstructions from location C occurring without an error. During the first cycle while the microinstruction read from control store Z is being executed and signals RDROUT contain the contents of control store location Z, the next address generation logic 203 is developing the address of the next microinstruction and at Time 2 of cycle 1, develops the address which points to location A in the control store and therefore signals PNXROSA contain the address of location A. During the same cycle, signal SNXROSA will point to the address of the microinstruction currently being executed, in this case it is location Z. Because there has not been a control store read error, signal HRDRTRY is a binary ZERO and therefore multiplexer 207 selects the address at its A input and makes signal NXROSAD equal to the address developed by next address generation logic 203 and therefore at some time during Time 2, signal NXROSAD points to location A. At the beginning of Time 3 of the first cycle, the ROS address register 209 is clocked by signal T2 and causes its output, signal ROSADDR, to point to location A. When the address of location A in the control store is presented to microprocessor ROS 109, the addressed location is read out of the control store and during Time 4 the first cycle the contents of location A become available as signal MPROSDT. At the end of the first cycle when signal T4 transitions from the binary ONE to the binary ZERO state, ROS data register 201 is clocked causing its output signal, RDROUT, to equal the contents of location A from the control store.

During the second cycle when the microinstruction from location A of the control store is executed, the next address generation logic 203 develops the address for the next microinstruction which is located in location B of the control store and during this cycle PNXROSA points to location B at the beginning of Time 2. At the end of the first cycle, the stored ROS address register 205 is clocked when signal T4 transitions from the binary ONE to the binary ZERO state and thus stores the address of the location in the control store from which the currently executing microinstruction was fetched. Thus, during the second cycle, signal SNXROSA points to location A. Again, during this second cycle, because there has not been a read error detected, multiplexer 207 selects the A inputs to be gated onto its outputs, thus signal NXROSAD points to control store location B sometime during Time 2. At the end of Time 2 of cycle 2, the address of location B of the control store is latched into ROS address register 209 and thereafter signal ROSADDR points to location B. Location B is then read from the control store with the contents of location B becoming available sometime during Time 4 of the second cycle thus making signal MPROSDT equal to the contents of location B. At the end of the second cycle, ROS data register 201 is clocked and the contents of location B then become available as signal RDROUT during cycle 3.

During the third cycle, next address generation logic 203 develops the address to point to location C of the control store. At the end of the second cycle, stored ROS address register 205 was clocked and the signal SNXROSA points to location B during the third cycle. Because no error was detected when the contents of location B were read from the control store, multiplexer 207 continues to select the A inputs to be gated onto its output and signal NXROSAD points to location C during Time 2 of the third cycle. The address of location C is then latched into ROS address register 209 at the end of Time 2 of this third cycle making signal ROSADDR point to location C. Location C is then read out from the control store during the third cycle making signal MPROSDT equal to the contents of location C during Time 4 of the third cycle. At the end of the third cycle, the contents of location C are clocked into ROS data register 201 making its output, signal RDROUT, contain the contents of location C during cycle 4.

FIG. 4 assumes that when location C was read from control store during cycle 4, a transient error occurred causing a single bit error within the 104-bit microinstruction received from the control store. During this fourth cycle, parity generator 305 will detect the parity error because the calculated parity will not be equal to the stored parity bit which comes into parity generator as signal ROSPART on line 368. This will cause parity generator 305 to produce a binary ONE at its even output causing signal ROSPERR to become a binary ONE sometime during Time 2 of the fourth cycle. Signal ROSPERR becoming a binary ONE will cause signal CANCEL to become a binary ONE sometime during Time 2 of the fourth cycle. At the end of the fourth cycle, when retry flip-flop 317 is clocked by signal T4 transitioning form the binary ONE to the binary ZERO state, signal HRDRTRY becomes a binary ONE. During this fourth cycle signal ROSPERR is a binary ONE at the input of inverter 227 causing its output to be a binary ZERO thus disabling NAND gate 229 and thereby blocking timing signal T4 at the other input of NAND gate 229 and inhibit its output, signal CKLS on line 230, from transitioning through the binary ZERO to the binary ONE state thus preventing the clocking of stored ROS address register 205. Thus, at the end of cycle 4, signal SNXROSA remains unchanged and continues to point to location C which was the address of the microinstruction which was read from the control store with an error.

Control store read error signal ROSPERR becomes a binary ONE during cycle 4 and signal HDRDTRY used to select the input of multiplexer 207 remains a binary ZERO during cycle 4 and therefore signal PNXROSA is gated onto the outputs of multiplexer 207 causing signal NXROSAD to point to location D in the control store during cycle 4 so that at the end of Time 2, when ROS address register 209 is latched, signal ROSADDR will point to location D within the control store during Times 3 and 4 of cycle 4 causing location D within the control store to be addressed. Location D becomes available at the data outputs of the control store making signal MPROSDT contain the contents of location D during the end of cycle 4 and the beginning of cycle 5. At the beginning of cycle 5, the contents of location D of the control store are clocked into data register 201 making its output signal RDROUT contain the contents of location D. During cycle 5, the next address generation location 203 develops the address of the next microinstruction to be read from the control store and using the contents of location D generates the address of location E causing signal PNXROSA to point to location E at the beginning of Time 2 of cycle 5.

At the end of cycle 4, when signal T4 transitions from the binary ONE to the binary ZERO state, retry flip-flop 317 is clocked thus gating signal ROSPERR at its data input onto its Q output. Because at the end of cycle 4, signal ROSPERR is in the binary ONE state, this will result in the setting of retry flip-flop 317 causing its output signal HRDRTRY to become a binary ONE at the beginning of Time 1 of cycle 5 and staying a binary ONE until the end of Time 4 of cycle 5 as is shown in FIG. 4. In cycle 5 location D was read without error from the control store causing the output of parity generator 305, signal ROSPERR, to become a binary ZERO sometime during Time 2 after the error free parity bits have been clocked into parity register 301 at the beginning of Time 2 of cycle 5 with the glue logic ROS data bits and the overall ROS parity bit having been clocked into ROS data register 303 at the end of the previous Time 4 of cycle 4 (which is the beginning of Time 1 of cycle 5) when the output of inverter 333 transitions from the binary ZERO to the binary ONE state. Therefore, during cycle 5, signal ROSPERR returns to the binary ZERO state during Time 2 but, because signal HRDRTRY is a binary ONE, the CANCEL signal output by OR gate 313 remains a binary ONE until the end of cycle 5 because signal ROSERRB will remain a binary ONE until that time.

During cycle 5, with the hardware retry signal HRDRTRY being a binary ONE, multiplexer 307 will select the B inputs thus gating signal SNXROSA onto its outputs and resulting in signal NXROSAD pointing to location C within the control store and not location E, which is the next location that would normally be referenced had location C been read without an error. At the end of Time 2 of the fifth cycle, ROS address register 209 is latched thus causing its output signal ROSADDR to point to location C and thus causing location C to be reread from the control store with the contents of location C once again becoming available during Time 4 of the fifth cycle and being clocked into ROS data register 201 at the end of Time 4 of the fifth cycle. Because the control store error signal ROSPERR returned to the binary ZERO state during cycle 5, NAND gate 229 was partially enabled prior to the occurrence of signal T4 becoming a binary ONE. Thus, when signal T4 transitioned from the binary ONE to the binary ZERO state at the end of Time 4, signal CLKS on line 230 at the output of NAND gate 229 will transition from the binary ZERO to the binary ONE state and clock stored ROS address register 205 thus clocking into it the contents of signal PNXROSA thus making signal SNXROSA point to location E during cycle 6. During cycle 5, because the CANCEL signal is in the binary ONE state, the AND gate 331 of clock generator 125 is disabled thereby preventing the binary ONE of signal T3 from being gated onto signal CLK4 thus preventing signal CLK4 from becoming a binary ONE during Time 4 of cycle 5 as was also prevented during Time 4 of cycle 4.

During cycle 6 while the microinstruction from location C is being executed, the next address generation logic once again develops the address for the next microinstruction. In this case it points to location D in the control store causing signal PNXROSA to point to location D. Because signal HRDRTRY has returned to the binary ZERO state at the end of cycle 5, during cycle 6 multiplexer 207 once again selects the A inputs to be gated onto its outputs. Therefore, signal NXROSAD will point to location D during Time 2 of cycle 6. At the end of Time 2 of cycle 6, ROS address register 209 is latched so that signal ROSADDR will point to location D and location D will be read from the control store. At the end of cycle 6, the contents of location D become available and are clocked into ROS data register 201 at the beginning of cycle 7. At the end of cycle 6, because the control store error signal ROSPERR is a binary ZERO, because no read error was detected, NAND gate 229 is fully enabled and the clocking of stored ROS address register 205 will result in signal SNXROSA pointing to location D during cycle 7. During cycle 7, the next address generation location develops the address of location E which is then read from the control store with the contents of location E being latched into RDROUT at the beginning of cycle 8. During cycle 8, the next address generation logic develops the address of location F which is then read from the control store.

From the above discussion, and by looking at signal ROSADDR and signal RDROUT in FIG. 4, it can be appreciated that during one microinstruction cycle, the address of the next microinstruction is developed while the current microinstruction is executed and using that developed address the reading of the next microinstruction from the control store is begun such that the microinstruction will be available at the beginning of the next cycle. It can be further appreciated by examining FIG. 4 that the read error is only discovered after the execution of the microinstruction with the read error has begun and that microprocessor logic 101 recovers from this by aborting the execution of the current microinstruction and permitting the reading of the next microinstruction to proceed. During the execution of the next microinstruction which is also aborted, the microinstruction which was originally read with an error is reread. During the execution of the reread microinstruction, the address of the next microinstruction is again developed and reading of the next microinstruction is initiated so that it will be available when execution of the first reread microinstruction is completed. This can be seen by noting that signal ROSADDR addresses location C during cycle 3 and cycle 5 and that location D is addressed during cycle 4 and cycle 6 and that signal RDROUT, which contains the microinstruction being executed, contains the contents of location C during cycle 4 with its execution aborted by signal CLK4 remaining a binary ZERO and that location D is executed during cycle 5 and its execution aborted by signal CLK4 remaining a binary ZERO and then location C is executed completely during cycle 6 followed by the complete execution of location D during cycle 7.

The ability of the central processor unit to reread and re-execute a microinstruction originally read from the control store with an error is dependent upon designing the central processor unit so that no change in status within the central processing system is made before it is determined that the microinstruction has been read from the control store without an error. The method by which this can be done can be appreciated by referencing FIG. 2 and FIG. 4. The method by which this is done can be understood by examining other elements within microprocessor 101 and cache memory 107.

Figure 2:
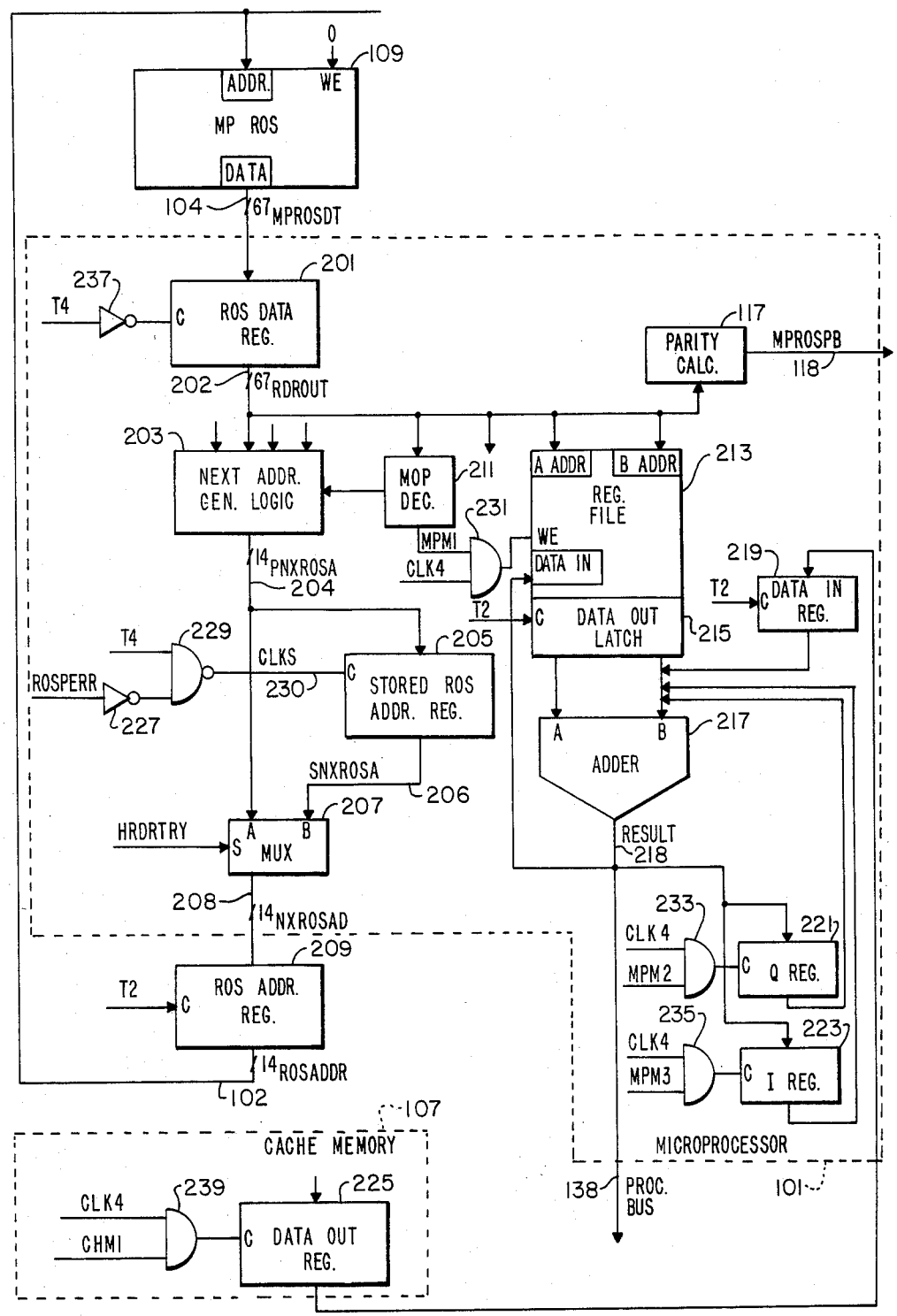
FIG. 2 is a more detailed logic block diagram of the microprocessor of FIG. 1.

FIG. 2 shows additional exemplary logic elements within microprocessor 101. Register file 213 is a multiword register file having an A address and a B address port which allow the microinstruction contained in ROS data register 201 to specify two locations within the register file which are to be latched into data output latch 215 at the beginning of Time 2 by clocking signal T2. One of the two data words latched in data out latch 215 goes to the A input of adder 217 and the other word goes to the B input of adder 217. Adder 217 is of is controlled by microoperation decoder 211 (by signals not shown in FIG. 2) thereby permitting the microinstruction to control the arithmetic/logic function to be performed by adder 217. Adder 217 performs the logical function on the A and B inputs during Time 2 and 3 of the cycle making the result available on line 218 before the beginning of Time 4. The result at the output of adder 217 is fed back to the data in input of register file 213 and also to the inputs of Q register 221 and I register 223 as well as onto processor bus 138. Although the output of adder 217 is available at these three inputs, it is not clocked into any of these inputs unless clocking signal CLK4 transitions from the binary ZERO to the binary ONE state.

The write enabling of register file 213 is controlled by the output of AND gate 231 which will be paritally enabled if microoperation decoder 211 makes signal MPM1 a binary ONE which will occur if the microinstruction contains a microoperation indicating that the output of the adder 217 is to be written into register file 213. Similarly, the output of adder 217 will be written into Q register 221 or into I register 223 when clocking signal CLK4 transitions from the binary ZERO to the binary ONE state if microoperation decoder makes signal MDM2 a binary ONE or MDM3 a binary ONE at one input of AND gates 233 and 235, respectively. Signals MDM2 and MDM3 also originate from microoperation decoder 211 and become binary ONEs depending upon the microoperation encoded within the microinstruction word.

By examining FIG. 4, it can be seen that signal CLK4 does not become a binary ONE during Time 4 of cycle 4 when the parity error was discovered and the execution of the microinstruction in location C was aborted, nor does it become a binary ONE during the execution of the microinstruction from location D during cycle 5. Although microinstruction D was read without error during cycle 4 and is available during cycle 5, its execution must be aborted because the execution of the microinstruction from location D may be dependent upon the microinstruction from location C having been properly executed. Therefore, the execution of the microinstruction from location D in cycle 5 must be aborted to make sure that the microinstruction from location C is read without error and then executed before the execution of the microinstruction from location D can be permitted. By looking at FIG. 2, it can be appreciated that no permanent change in state is made in the central processor by a microinstruction that is aborted because it has an error or it follows a microinstruction that had an error. This is done by having state changes clocked by signal CLK4 and preventing the generation of signal CLK4 during cycles associated with aborted microinstructions.

It should be noted that the data out latch 215 is unconditionally clocked at the beginning of Time 2 by timing signal T2 as is data in register 219. Although these may appear to contradict the above rule that no state change may be made within the central processor unless the microinstruction has been read without error, it should be noted that even though invalid data may be clocked into either data out latch 215 or data in register 219, the correct data will be clocked into them the next time the microinstruction is read without error. In the case of data out latch 215, since all its inputs only originate in register file 213 and no change is allowed to be made in register file 213 by a microinstruction whose execution is aborted, all possible inputs to data out latch 215 are maintained in an unchanged state and therefore are available for the next time a microinstruction is executed without being aborted. The same is true with respect to data in register 219 which is unconditionally clocked at Time 2, but its only source of input is data out register 225 in cache memory 107. Data out register 225 is only clocked if signal CLK4 occurs at one input of AND gate 239 with the other input of AND gate 239 being controlled by receiving signal CHM1 which would be a binary ONE if the microoperation decoder in the cache memory makes it a binary ONE as a function of some microoperation encoded within that portion of the microinstruction word executed by cache memory 107. Therefore, although data in register 219 is clocked, each microinstruction cycle whether or not the microinstruction was read without an error, it is always in a position to be reloaded with unchanged data the next time the microinstruction is executed without an error.

Clocking signal CLK4 is used throughout the central processor in order to clock state changes that, if made, would prevent the re-execution of an abort microinstruction. Thus, signal CLK4, besides being used in microprocessor 101, is used in virtual memory management unit 103, glue logic 105 and cache memory 107. Although not needed in the central processor of the preferred embodiment, other cancellable clocking signals could be developed. For example, a CLK3 that is normally a binary ONE during Time 3 could be developed at a Q5 output of clock register 327 by feeding the output of an AND gate having signals T2 and CANCEL-bar as inputs into a D5 input of clock register 327.

Although the above discussion has been in terms of a control store being used to control the execution of microinstructions in a central processing unit, the above principles are equally applicable to a control store being used to control the execution of microinstructions in other processing units. Further, although the above discussion has been in terms of having a central control store divided into multiple smaller control stores, each feeding a single unit, the principles of the present invention are equally applicable to a single control store feeding one or a plurality of units.

Although the above discussion has been in terms of having the execution of a current microinstruction overlapped by the reading of the next microinstruction, the principles of the present invention are equally applicable if the execution of one microinstruction overlaps the reading of a plurality of microinstructions or if the reading of the next microinstruction does not begin before the completion of the current microinstruction. If the execution of the current microinstruction is completed before the reading of the next microinstruction has begun, the logic can be simplified by eliminating the stored ROS address register 205 and retry flip-flop 317, both of which are used to ensure that the address of the microinstruction that is read with an error is not lost and so that the execution of the next microinstruction following the current microinstruction with the error is aborted, respectively. In this case, however, the system must still be designed such that no register is permanently changed within the system before it is verified that the current microinstruction is without error. If the execution of a current microinstruction is overlapped with reading a plurality of next microinstructions, the system will need to be modified so that the execution of the plurality of the next microinstructions is aborted while still assuring that no register is permanently changed until it is verified that the current microinstruction is without error.

Although the above invention has been described in terms of a system employing a single parity bit within the microinstruction, the same principles are equally applicable to a system employing a plurality of parity bits. Further, the system is equally applicable to a microinstruction word which contains an error detection and correction code which allows either single or multiple bit errors to be detected and corrected without having to reread the microinstruction from the control store. If an error detection and correction code is employed, the system can be modified so that instead of rereading the microinstruction from memory, the corrected microinstruction is used and, depending upon how fast the corrected microinstruction becomes available, the execution cycle associated with the microinstruction read in error could be shortened or the execution cycle of the following microinstruction, which is thrown away in order to reread the microinstruction in error, could be shortened.

While the invention has been shown and described with reference to the preferred embodiment thereof, it will be understood by those skilled in the art that the above and other changes in form and detail may be made therein without departing from the spirit and scope of the invention.

What is claimed is:

1. A method for recovering from an error while reading microinstructions in a microprogrammed controlled system comprising the steps of:
   A. beginning execution of a microinstruction read from a control store;
   B. checking if said microinstruction was read without error by use of error detection information associated with said microinstruction;
   C. generating an address of a next microinstruction in the control store during steps A and B by use of information associated with said microinstruction;
   D. inhibiting any change of state in said system caused by the execution of said microinstruction which will prohibit said microinstruction from being re-executed until after it is determined that said microinstruction was read without error;
   E. completing execution of said microinstruction if said microinstruction was read without error;
   F. aborting execution of said microinstruction if said microinstruction was read with an error;
   G. returning to step A to execute said next microinstruction if said microinstruction was read without error; and
   H. returning to step A to reread and re-execute said microinstruction if said microinstruction was read with an error.

2. The method of claim 1 wherein said step of checking for read errors is performed by making a parity calculation on the bits of said microinstruction and comparing the result with parity data associated with said microinstruction.

3. The method of claim 1 wherein the address of said next microinstruction is stored during the execution of said microinstruction if said microinstruction was read without error and wherein said stored next microinstruction address is used to reread said microinstruction if said microinstruction was read with an error.

4. The method of claim 1 wherein said system comprises a plurality of subunits, each having a portion of the control store associated with it, and said microinstruction comprises a plurality of portions, each read from a portion of the control store, and wherein each subunit is controlled by a portion of said microinstruction read from a portion of said control store associated with the subunit and wherein each subunit performs a portion of said microinstruction read error determination based on its respective portion of the microinstruction with the results being accumulated by one of said subunits to form a cumulative result which is used in step D to inhibit changes in all subunits and to control whether said next microinstruction is read or said microinstruction is reread.

5. The method of claim 1 wherein said step of checking for read errors is performed by making a parity calculation on the bits of said microinstruction and comparing the result with parity data associated with said microinstruction.

6. The method of claim 1 wherein the calculation of an address of said next microinstruction is done during the execution of said microinstruction and wherein the address of said next microinstruction is stored during the execution of said microinstruction if said microinstruction was read without error and wherein said stored next microinstruction address is used to reread said microinstruction if said microinstruction was read with an error.

7. A microprogrammed control system comprising:
 A. a control store for storing a plurality of microinstructions;
 B. means for reading a current microinstruction of said plurality of microinstructions from said control store;
 C. means for executing said current microinstruction;
 D. means for detecting if said current microinstruction was read without an error from said control store;
 E. means for generating, while executing said current microinstruction and detecting if said current microinstruction was read without an error, a next address of a next microinstruction to be read from said control store;
 F. means for inhibiting said means for executing from making any change in the state of said microprogrammed control system that would prohibit said current microinstruction from being re-executed before said means for detecting a read error has determined that said current microinstruction was read without error; and
 G. means for aborting the execution of said current microinstruction by said means for executing if said means for detecting determines that said current microinstruction was read with an error.

8. The system of claim 7 further comprising:
 A. means for storing said next address if said current microinstruction was read without error from said control store; and
 B. means for transferring said next address from said means for storing to said means for reading if said current microinstruction was read with an error.

9. The system as in claim 8 wherein execution of said one or more next microinstructions is aborted if said current microinstruction was read with a read error and wherein said current microinstruction is reread from said control store and re-executed after execution of said one or more next microinstructions is aborted.

10. A method for recovering from an error while reading microinstructions from a control store in a microprogrammed controlled system, the system comprising a plurality of subunits, each controlled by a portion of each microinstruction stored in a portion of the control store associated with the subunit, the method comprising the steps of:
 A. reading a microinstruction from the control store;
 B. beginning execution of said microinstruction;
 C. in a microinstruction read error determination checking if said microinstruction was read without error by use of error detection information associated with said microinstruction, each subunit performing a portion of the microinstruction read error determination based on its respective portion of the microinstruction with the results being accumulated by one of said subunits;
 D. inhibiting any change of state in said system caused by the execution of said microinstruction which will prohibit said microinstruction from being re-executed until after it is determined that said microinstruction was read without error;
 E. completing execution of said microinstruction if said microinstruction was read without error and advancing a control store address to point to a next microinstruction;
 F. aborting execution of said microinstruction if said microinstruction was read with an error;
 G. returning to step A to read said next microinstruction if said microinstruction was read without error; and
 H. returning to step A to reread said microinstruction if said microinstruction was read with an error.

11. A method for recovering from an error while reading microinstructions from a control store in a microprogrammed controlled system wherein the system is able to execute successive microinstructions in successive system cycles, the method comprising:
 A. in a system cycle:
  i. beginning execution of a microinstruction from the control store;
  ii. checking if said microinstruction was read without error by use of error detection information associated within said microinstruction;
  iii. generating an address of a next microinstruction in the control store by use of information associated with said microinstruction and addressing the control store to fetch the next microinstruction;
  iv. inhibiting any change of state in the system caused by the execution of said microinstruction which will prohibit said microinstruction from being re-executed until after it is determined that the microinstruction was read without error;
  v. completing execution of the microinstrution if the microinstruction was read without error;
  vi. aborting execution of the microinstruction if the microinstruction was read with an error;
 B. returning to step A to execute the next microinstruction in the next system cycle if the microinstruction was read without error; and
 C. promptly rereading the microinstruction from the control store and returning to step A to re-execute the microinstruction if the microinstruction was read with an error.

12. A method as claimed in claim 11 wherein the microinstruction is reread in step C in the next system cycle while the next microinstruction is being executed but any change of state in said system caused by execution of the next microinstruction is inhibited.

13. A method as claimed in claim 11 wherein the step A ii of checking for read error is performed by making a parity calculation on the bits of the microinstruction and comparing the result with parity data associated with the microinstruction.

14. The method of claim 11 wherein said system comprises a plurality of subunits, each having a portion of the control store associated with it, and said microinstruction comprises a plurality of portions, each read from a portion of the control store, and wherein each subunit is controlled by a portion of said microinstruction read from a portion of said control store associated with the subunit and wherein each subunit performs a portion of said microinstruction read error determination based on its respective portion of the microinstruction with the results being accumulated by one of said subunits to form a cumulative result which is used in step A iv. to inhibit changes in all subunits and to control whether said next microinstruciton is read or said microinstruction is reread.

* * * * *